May 3, 1949.　　　　K. E. HENRIKSON　　　　2,468,875
RADIAL CLEARANCE GAUGE
Filed Feb. 14, 1946　　　　　　　　　　2 Sheets-Sheet 1
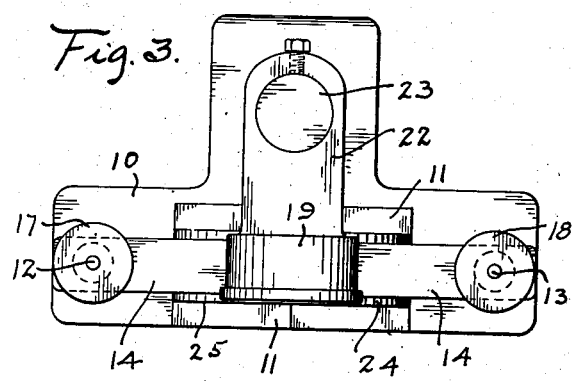
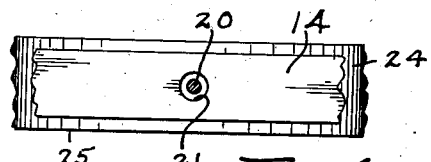
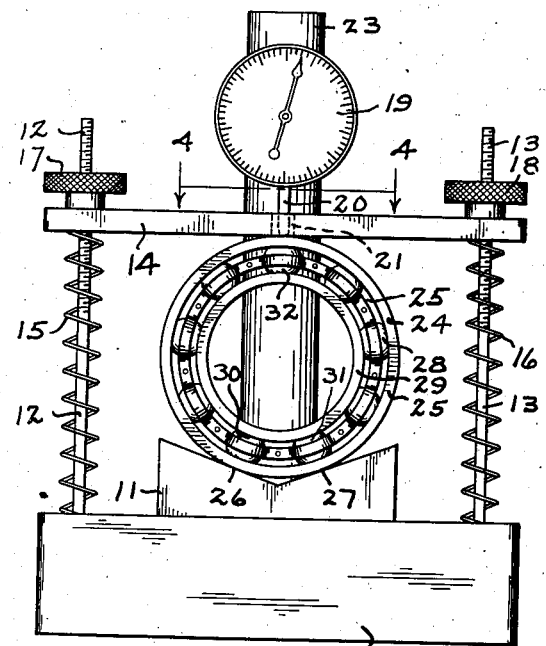
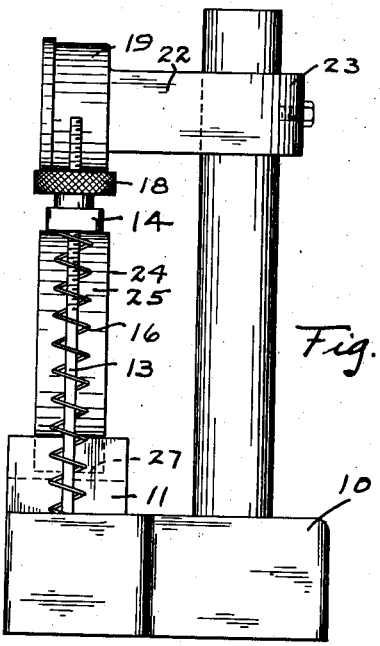
INVENTOR,
KARL E. HENRIKSON,
By Herbert A. Minturn,
ATTORNEY.

May 3, 1949.  K. E. HENRIKSON  2,468,875
RADIAL CLEARANCE GAUGE
Filed Feb. 14, 1946  2 Sheets-Sheet 2
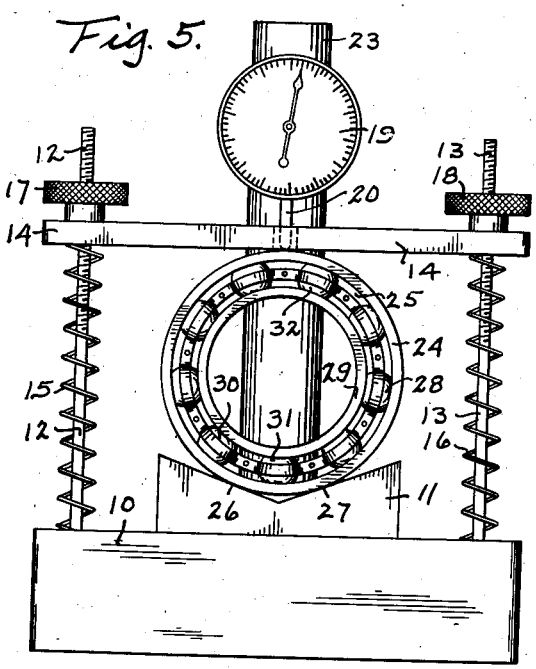
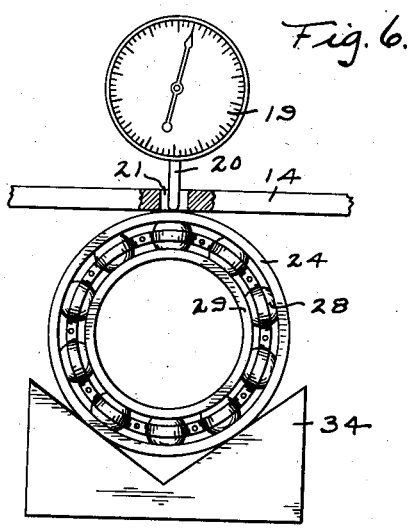
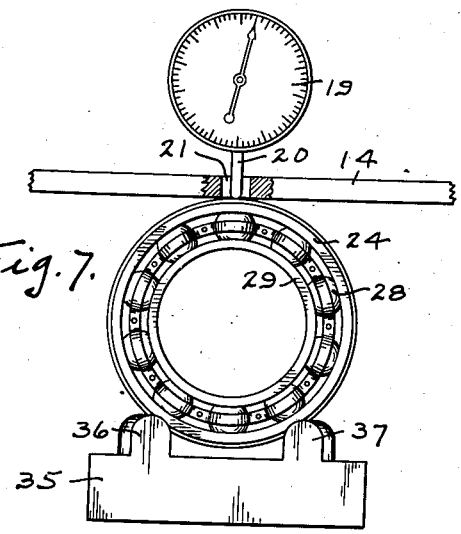
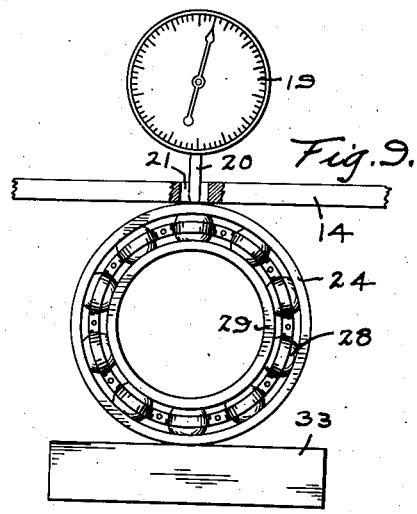
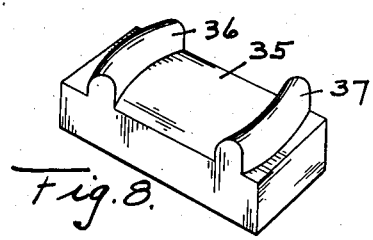
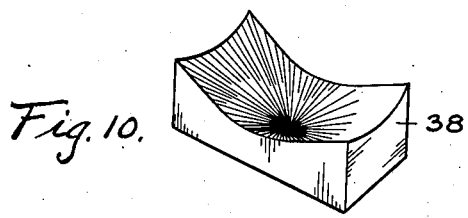
INVENTOR,
KARL E. HENRIKSON,
By Hubert G. Minturn,
ATTORNEY.

Patented May 3, 1949

2,468,875

UNITED STATES PATENT OFFICE 2,468,875

RADIAL CLEARANCE GAUGE

Karl E. Henrikson, Indianapolis, Ind.

Application February 14, 1946, Serial No. 647,466

5 Claims. (Cl. 33—174)

This invention relates to means for measuring radial clearances between inner and outer races of bearings carrying balls or rollers therebetween.

The correct operation and life of a ball bearing (roller bearings present the same problems) are vitally dependent upon the amount of radial clearance or what may be termed radial interference existing in the installed bearing. A ball bearing will run cool even when the clearance is negative, which condition might be called radial interference. In this condition, a load is had on every ball all the time, and if the load be excessive will cause premature fatigue failure. To the contrary, if there be too much clearance embodied in the bearing, it will probably be noisy, and not properly guide or align the shaft carried by the bearing. Further in this excessive clearance condition, the load will be concentrated upon a few balls over a small raceway area causing premature failure.

By radial clearance is meant the total movement of the inner bearing member relative to the outer bearing member (between which the balls or rollers may be carried) in a direction at right angles to the bearing axis without deformation of any of the component parts of the bearing. Ball bearings particularly are sensitive to loads, and ordinary means heretofore employed for detecting either axial or radial clearance causes deformation of some or all of the component parts of the bearing sufficient to make readings of measuring devices questionable.

If it be desired to press fit either an outer or an inner race in a housing or on a shaft respectively, it is essential to know what radial clearance the bearing had before being pressed into position so that when pressed, there will be a definite, known radial clearance. Further, in applications of the bearings where there may be temperature differentials, a definite radial clearance above average practice is required. Therefore the user of bearings, ordered with a special clearance, should have a direct, simply operated, and most accurate means of measuring that clearance.

It is possible for the manufacture of bearings to assemble them to have a definite radial clearance by carefully measuring each and all of the component parts. However, parts with compound curves are difficult to measure to avoid error caused by deformation, wear, dirt, or temperature differentials. Furthermore bearings carried in stock, may "age" in one or more of their component parts to introduce a change in shape or size to cause a variation from the original radial clearance. If either of the outer or inner races are out of round, the radial clearance will vary in different relative positions thereof.

Axial clearance or movement of one race of a bearing relative to the other race in an axial direction is a common method to determine the clearance in ball and non-cylindrical roller bearings. In roller bearings having a definite thrust angle and also in rolling elements not too sensitive to deformation under load, axial movement can be reliably used to determine radial clearance. Of course feeler gauges may be employed where radial clearances are relatively great and accuracy is not required. In ball bearings, the axial movement method is comparative, provided the bearing surfaces have identical curvatures and identical surface finish. A ball bearing with zero radial clearance will show an appreciable reading on an axial clearance gauge due to deformation of balls and raceways. Of course in some applications of bearings the axial clearance determination is definitely required, but in the great majority of cases, the direct radial clearance determination is actually the most critical.

In an axial clearance test, it cannot be known when enough thrust load is applied in the axial direction to cause the component parts to conform to each other, because if sufficient load is applied to assure this condition, there may be an appreciable error caused by actual deformation of those parts. On the other hand if the load be insufficient to produce that condition, too low a reading of clearance will result.

In my invention, I apply a load to the exterior surface of the outer race of the bearing so as to distort that outer race in the same direction as of the diameter measurement to be taken. Then an instrument of sufficient sensitivity is employed to indicate changes in the diameter of that outer race as the rolling elements (balls or rollers) are shifted around past the radial line of measurement when the inner race is rotated.

A primary advantage of my invention resides in its simplicity of set-up and the extreme accuracy achieved, all as will be better appreciated and understood by those versed in the art as further described with reference being had to the accompanying drawings diagrammatically illustrating the invention, in which drawings, Fig. 1 is a view in front elevation of a measuring device embodying the invention;

Fig. 2, a view in side elevation;

Fig. 3, a view in top plan;

Fig. 4, a transverse section on a line 4—4 in Fig. 1;

Fig. 5, a view similar to that in Fig. 1, but with the inner race and the rolling elements revolved to a different position;

Fig. 6, a diagram of the essential measuring elements as applied to a ball bearing with the number of balls exceeding those shown in Fig. 1;

Fig. 7, a similar view showing a modified form of bearing supporting anvil;

Fig. 8, a view in perspective of the anvil shown in Fig. 7;

Fig. 9, a diagrammatic view in front elevation of the essential measuring elements as applied to a ball bearing having balls so spaced therein as to be positioned, two on a common diameter, the bearing being supported by a planar anvil; and, Fig. 10, a further modified form of anvil shown in perspective.

Like characters of reference indicate like parts throughout the several views in the drawings.

Referring first to Figs. 1-4, upon any suitable base member 10 is mounted an anvil 11, herein shown as constituting a V block. On opposite sides of the anvil 11 are fixed posts 12 and 13 to slidingly receive thereover by its opposite end portions a beam 14. Like compression springs 15 and 16 surround the posts 12 and 13 respectively normally holding the beam 14 in an upper position. Thumb nuts 17 and 18 screw threadedly engage the upper ends of the posts 12 and 13 as means to force the beam 14 downwardly.

Suitably mounted adjacent to beam 14 is a sensitive indicator gauge 19 having its operating plunger 20 extending downwardly through an aperture 21 in the beam 14, the plunger or pin 20 being free of contact with the beam 14. In the present example, the gauge 19 is mounted on an arm 22 that is fixed at the proper elevation along the post 23 for the particular diameter of bearing which is being checked. The post 23 is shown as being conveniently supported by the base 10. To illustrate the invention, the ball bearing type of bearing is selected. A bearing generally designated by the numeral 25 is placed on the top side of the anvil 11 to have the circumferential surface of the outer race 24 rest on transverse lines across the two upper faces of the anvil, the outer ends of these lines being indicated by the numerals 26 and 27. This particular shape of anvil 11 with the angle between those faces as indicated in Fig. 1 is selected where there are an uneven number of balls 28 carried between the outer race 24 and the inner race 29 whereby the inner race 29 may be revolved to position the two lowermost balls 30 and 31 to have radial planes from the center of the bearing 25 include diametrical planes of the two balls and also include the lines 26 and 27. With the balls 30 and 31 thus positioned, an upper ball 32 is centered in a vertical diametrical plane of the bearing 25.

With the bearing 25 thus positioned, the beam 14 is lowered against the outer race 24 by running down the thumb nuts 17 and 18 so as to apply a load through the beam 14 to the race 24 tending to distort that race.

The indicator 19 is positioned vertically to have the lower end of its pin 20 rest against the surface of the race 24 and set to zero reading. The beam 14 particularly, and preferably the other members 12 and 13, are made to be sufficiently light so as to permit perceptible deflections of the beam 14 under slight changes in load.

The inner race 29 is then rotated in one direction or oscillated slowly as the beam 14 is lowered against the race 24. Reading of the indicator gauge 19 will show reduction in diameter of the race 24 as it may be squeezed down by pressure exerted through the beam 14. When all radial clearance as between the inner race 29, and the balls 28, and the outer race 24, is gone, the three balls 30, 31, and 32 will simultaneously be restricted as to space therebetween. When this clearance is entirely removed and the outer race continued to be deformed beyond that condition by an amount of even only a few millionths of an inch, there will be a pressure exerted vertically on the outer race 24 tending to hold the race 24 to a specific overall dimension at its contact with the beam 14, and when each ball rolls past that zone of contact, a slight reduction in pressure will be had against the beam 14, the pressure being restored again in the form of pulsations as each ball 28 (assuming them to be of substantially the same diameter) travels around the race 24 past that zone. These pulsations will be reflected in the readings of the indicator gauge 19. The change in indicator readings between the two conditions, gives the approximate radial clearance. For ordinary bearing applications, this approximate radial clearance is sufficiently accurate.

The detection of the pulsations on the indicator gauge 19 determines accuracy. If there be any question as to whether or not the pulsations indicated are actual, or caused by forming other than ball pressure (such as dirt) additional deflection will make the pulsations heavier and more distinct. When the true pulsations are recognized, the load can be released until these pulsations are just perceptible. For the calibration of bearings to be used as masters, or when maximum accuracy is required, the average of two readings taken at 90° on the outer race 24 should be taken.

Theoretically the approximate radial clearance above indicated should be corrected due to the positions of the contacts of the outer race 24 with the anvil 11 and due to the distorted outer race 24. The actual radial clearance would equal two times the indicator gauge difference of readings between the high and low divided by one plus the secant of the quotient of 180° divided by the number of balls in the bearing. For a bearing having nine balls, the actual radial clearance would be .97 indicator difference.

For bearings having an even number of balls, it is possible to use a flat anvil 33, Fig. 9, in which case there are but the two contacts on the outer race 24, namely, the upper contact by the beam 14 and a single line contact with the planar surface of the anvil 33. In this case the indicator difference between readings would be the actual radial clearance. It is to be understood that this difference between indicator readings above referred to is that difference between the initial indicator reading as secured by the pin 20 bearing on the race 24 and that reading at which the "pulsating" condition arises when the race 24 is stressed by the load application through the beam 14. That is to say the actual degree of pulsation is not the measure of clearance, but the measure does arise as being the difference between the initial reading for the normal unstressed diameter of the race 24 and the changed diameter indicated when the "pulsating" of the indicators is produced upon revolving the inner race 29 to alternately roll one ball 28 after another past the zone of applied pressure. The position of the bearing component parts as illustrated in Fig. 1 is that position wherein a pulsation is being produced on the indicator hand of the gauge 19 as the bearing 32 goes through the uppermost position. Then in Fig. 5, the lowermost reading of that pulsation would be had with the bearing parts positioned as indicated where there is no ball directly in vertical alignment with the pin 20 or in radial line when the race 24 contacts with the sides of the anvil 11.

For bearings having an even number of balls a V block anvil 34, Fig. 6, may be employed wherein the angle between the upper faces is less than that shown in Figs. 1 and 5, the exact angle depending upon the number of balls carried. In any event the advantage of the V block over the flat anvil is the avoidance of difficulty in locating and supporting the bearing on the flat face. The angle of the V between the top faces of the block 34 should be 180° minus the quotient of 720° divided by the number of balls in the bearing. For example, a ten ball bearing would require a V block angle of 108°. The corrected radial clearance would be two times the indicator reading difference divided by 1 plus the secant of the quotient of 360° divided by the number of balls. Thus for a ten ball bearing, the correct radial clearance would be the indicator reading difference multiplied by .895.

Parallel bars or rails spaced apart obviously may be used to support the underside of the race 24, or as indicated in Figs. 7 and 8, the anvil 35 may carry the arcuate rails 36 and 37 where the outer face of the race 24 is spherical. The spacing apart would be governed by the presence of an even or an odd number of balls in the bearing, all as above indicated. The use of rails permits only one kind and size of bearing to be checked with the one setting, as opposed to the block anvil which automatically contacts the outer race of the bearing at the proper points or lines regardless of the diameter of that race, provided the bearing carries the right number of balls or rollers for the particular V angle. One further possibility of an anvil is that illustrated in Fig. 10 wherein the anvil 38 has a fragmentary conical surface particularly designed for use with spherical outer faces of the bearing. A particular advantage of this type of anvil is that a spherical bearing with a given number of balls is automatically properly located.

Confronted with double row ball or roller bearings, two general possibilities arise. If the two rows of rolling units (balls or rollers) are of separate cages, it is desirable to adjust those units so that they are in transverse pairs. Then when the bearing is being tested, with a rolling member at the top on one side, there will also be a like rolling member at the top in the other row whereby the pulsation is strengthened on the indicator gauge 19. However where the cages are integral as between the two rows of rolling elements, the rolling members are alternated transversely across the bearing and of course the pulsations produced at the indicator 19 will be more frequent and also weaker for the same deformation. In either case, the anvil V angle depends upon the number of rolling members in one raceway. Bearings assembled with negative clearance or with interference (minus clearance) will show weak pulsations when the inner race is turned in the absence of any external load applied to the race 24.

Detection of dirt or foreign particles is possible with this apparatus where a sensitive comparator (not shown) is used in place of the indicating type of gauge 19. When the outer race is deformed sufficiently to approach the pulsation point, dirt particles present will jam in between the ball or roller and the raceway causing the outer race to distort as the ball or roller travels over the dirt, to produce an uneven flicker of the comparator. Also detection of out of round condition of the outer race 24 is possible by checking the radial clearance at two or more circumferential positions of the race 24. Detection of out of round condition of the inner race 29 is made possible by determining the radial clearance at a number of positions of the inner race 29 in any one position of the outer race 24.

Detection of an off-size ball or roller is possible by determining the radial clearance separately with each ball or roller directly under the comparator. If the inner race 29 is out of round, the test will have to be repeated to prove consistency of results.

The use of the method employed in this invention is possible to automatically sort bearings according to radial clearance wherein some type of electric gauge head is employed in place of the indicator 19, such as an electric gauge which produces a pulsating current in accordance with the pulsations above indicated, and which pulsating current may be amplified as desired. Practically, the outer races 24 are sufficiently uniform in section that a definite load on this race will remove a definite amount of radial clearance independent of ordinary variations in the outside diameter of the race. The inner race would be revolved at a definite speed, and if the pulsation point is reached, the variations are applied to an electronic circuit and amplified in the usual and well-known manner, not forming a part of the invention per se.

While the invention has been described particularly in reference to the use of an indicator 19, it is to be understood than any number of present known measuring devices may be employed within the range of accuracy of the radial clearance indication required. For example commercial comparators will measure accurately to .00005 inch and will be sensitive to instantaneous changes of .00001 inch without difficulty. The accuracy of the present invention is to be had at a pulsating point which is readily visibly observed. Furthermore variations may be had in the means for applying the load to the outer race such as by deadweights or hydraulic pressure, the exact mode of application being immaterial so long as the pulsation may be produced against that applied load. Therefore I do not desire to be limited to the precise form of the invention above described beyond the limitations of the claims.

I claim:

1. The method of determining radial clearance in a bearing between inner and outer races and rolling elements therebetween which comprises applying a yielding load radially of the outer race to an amount which will just give a perceptible variation in the over all diameter of said outer race as the inner race is rotated to carry a rolling element past the zone of load application; rocking the inner race to carry a rolling element into the zone of said load application and measuring the difference between the initial unloaded outer race position and the loaded position thereof with said element in said zone.

2. The method of analyzing radial clearance between inner and outer races and rolling elements therebetween in a bearing which comprises measuring an initial diametrical condition of the bearing outer race; applying a yielding load radially of the outer race; rotating the inner race to alternately position and remove a rolling element from the zone of said load application; said load being adjusted to produce a condition of measurable perceptible increase and decrease in the diameter of said outer race at the point of load application under said inner race rotation; and measuring the difference in dimension between said initial condition and the said perceptible variation condition of the outer race diameter.

3. Those steps in a method of analyzing radial clearance in a bearing composed of inner and outer races having rolling elements therebetween, which comprise measuring the outside normal diameter of the outer bearing race; squeezing the outer race toward an elliptical shape sufficiently to eliminate substantially all radial clearance between said bearing members in the direction of the then smaller diameter of the outer race; rotating the inner bearing race to roll one at least of said rolling elements across said smaller diameter tending to press said outer race back toward said normal diameter; determining that condition wherein said element rolling will first produce a perceptible increase and decrease in race diameter at point of load application; and measuring the difference between the squeezed diameter at said condition and said normal diameter.

4. In a method of analyzing radial clearance in a bearing between inner and outer races with rolling elements therebetween, those steps of ascertaining a substantially no clearance condition which comprise rotating the inner race relative to the outer race and yieldingly squeezing the outer race one side toward the other until a measurably perceptible expansion and contraction of the outer race takes place upon the inner race rolling one of said elements past a zone of squeezing application.

5. In a method of analyzing radial clearance in a bearing between inner and outer races with rolling elements therebetween, those steps of ascertaining a substantially no clearance condition which comprise rotating the inner race relative to the outer race and yieldingly squeezing the outer race one side toward the other until a measurably perceptible expansion and contraction of the outer race takes place at the point being squeezed upon the inner race rolling one of said elements past a zone of squeezing application; and measuring the difference in the travel of said outer race at said zone between the unsqueezed and the squeezed condition.

KARL E. HENRIKSON.

REFERENCES CITED

The following references are of record in the file of this patent:

UNITED STATES PATENTS

| Number | Name | Date |
|---|---|---|
| 1,307,776 | Hacker | June 24, 1919 |
| 1,439,469 | Hapgood | Dec. 19, 1922 |
| 1,611,441 | Higgins | Dec. 21, 1926 |
| 1,617,284 | Ames | Feb. 8, 1927 |
| 1,637,482 | Graves | Aug. 2, 1927 |
| 2,407,648 | Boehm | Sept. 17, 1946 |
| 2,419,280 | Neff | Apr. 2, 1947 |